(12) United States Patent
Franklin, III et al.

(10) Patent No.: US 6,290,086 B1
(45) Date of Patent: Sep. 18, 2001

(54) CRYOGENIC TANK JOINT

(75) Inventors: Walter McRae Franklin, III, Canyon Country; David A. Hooke, Palmdale; John A. Klostermann, Sherman Oaks, all of CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/648,762

(22) Filed: Aug. 28, 2000

Related U.S. Application Data

(62) Division of application No. 09/398,714, filed on Sep. 20, 1999.

(51) Int. Cl.$^7$ .................................................. B65D 90/50
(52) U.S. Cl. .................. 220/564; 220/562; 220/560.11; 244/135 R
(58) Field of Search ........................ 244/135 R; 220/562, 220/564, 567.2, 560.07, 560.11, 560.15, 692, 693, 4.16, 4.17

(56) References Cited

U.S. PATENT DOCUMENTS

| | | | |
|---|---|---|---|
| 2,951,613 | * | 9/1960 | Hardigg . |
| 2,954,892 | * | 10/1960 | Dosker . |
| 3,979,005 | * | 9/1976 | Robinson et al. .................... 220/469 |
| 4,203,401 | * | 5/1980 | Kingsley et al. ..................... 123/520 |
| 4,452,162 | * | 6/1984 | Harbaugh ........................... 114/74 A |
| 5,054,635 | * | 10/1991 | Kolom ............................... 220/4.15 |
| 5,483,039 | * | 1/1996 | Gallagher ........................ 219/125.11 |

FOREIGN PATENT DOCUMENTS

| | | | |
|---|---|---|---|
| 1213943 | * | 11/1970 | (GB) . |
| 577987 | * | 6/1958 | (IT) . |

* cited by examiner

Primary Examiner—Stephen Castellano
(74) Attorney, Agent, or Firm—Robert A. Schruhl

(57) ABSTRACT

Improved joints for cryogenic liquid-containing tanks are disclosed. The joints include a support plate, a lower arm mounted on the support plate, an upper arm mounted on the support plate spaced from the lower arm, and tank skins extending into the space between the lower and upper arms. Sealing layers are provided between the tank skins and the joint arms. The joints are particularly useful for space launch vehicle cryogenic liquid propellant tanks, which must be lightweight, withstand high structural loads and maintain leak-free conditions.

18 Claims, 6 Drawing Sheets

CRYOGENIC TANK JOINT

CROSS REFERENCE TO RELATED APPLICATION

This application is a divisional of U.S. patent application Ser. No. 09/398,714 which was filed on Sep. 20, 1999 and is co-pending.

FIELD OF THE INVENTION

The present invention relates to joints for cryogenic liquid propellant tanks, and more particularly relates to a lightweight joint for carrying and transmitting high structural loads in multi-lobe cryogenic tanks.

BACKGROUND INFORMATION

Cryogenic liquid propellant tanks are used on space launch vehicles. For example, the X-33 single stage to orbit vehicle comprises multi-lobe cryogenic liquid propellant tanks. A description of the X-33 multi-lobe tanks is provided in U.S. application Ser. No. 09/009,355 filed Jan. 20, 1998, which is incorporated herein by reference.

Prior multi-lobe cryogenic liquid propellant tanks typically use woven composite joints as the joining member with the tank barrel and dome skins bonded to it. Manufacture of a composite joint of the length needed for single stage to orbit vehicles requires massive amounts of tooling and large autoclaves to perform the cure process. After cure, inspection of the composite part is difficult and repairs are usually needed in locations where the tooling did not provide the compaction required for a high performance laminate. Typically, the repair is associated with a reduction in strength. Woven composite joints are susceptible to cracks in the interior of the joint after cure, which are exacerbated by multiple cycles from cryogenic to elevated temperatures. Such cracking reduces the strength of the joint and increases the permeability and leakage through the joint.

Bonding barrel skins to composite preforms also presents many problems. First, manufacturing fit-up of the barrel skin to the preform is very difficult to achieve with the tolerances needed to ensure a high strength bond. Second, the time needed to place the skin onto the joint structure often exceeds the usable out-time of the adhesive used for bonding. Third, inspection of the bond line for strength is not possible with current technology. What is typically done is an inspection for voids or unbonds in the area, but no strength assumption can be made. Fourth, inspection during the lifetime of the vehicle is very difficult with limited repair options.

Another method of joining tank lobes is to use a bolted configuration with radius blocks to support the barrel and dome skins. Bolted designs with radius blocks have the problem of using bolts in tension and bending as the means of transferring load across the joint. Over time, the bolts may require inspection and retorquing that would require access to the inside of the tank. This leads to contamination and a required cleaning which is not practical in a quick turnaround environment. It is also difficult to seal the area where the barrel skins meet the dome skins with this method.

The present invention has been developed in view of the foregoing, and to address other deficiencies of the prior art.

SUMMARY OF THE INVENTION

The present invention provides a lightweight joint for carrying and transmitting high structural loads generated in cryogenic liquid propellant tanks, while maintaining a substantially leak-free condition.

A preferred joint of the present invention comprises a support plate, a lower arm mounted on the support plate, an upper arm mounted on the support plate spaced from the lower arm, a tank skin extending into the space between the lower and upper arms, and a seal between the tank skin and the lower and upper arms.

These and other aspects of the present invention will be more apparent from the following description.

DETAILED DESCRIPTION

Figure 1:
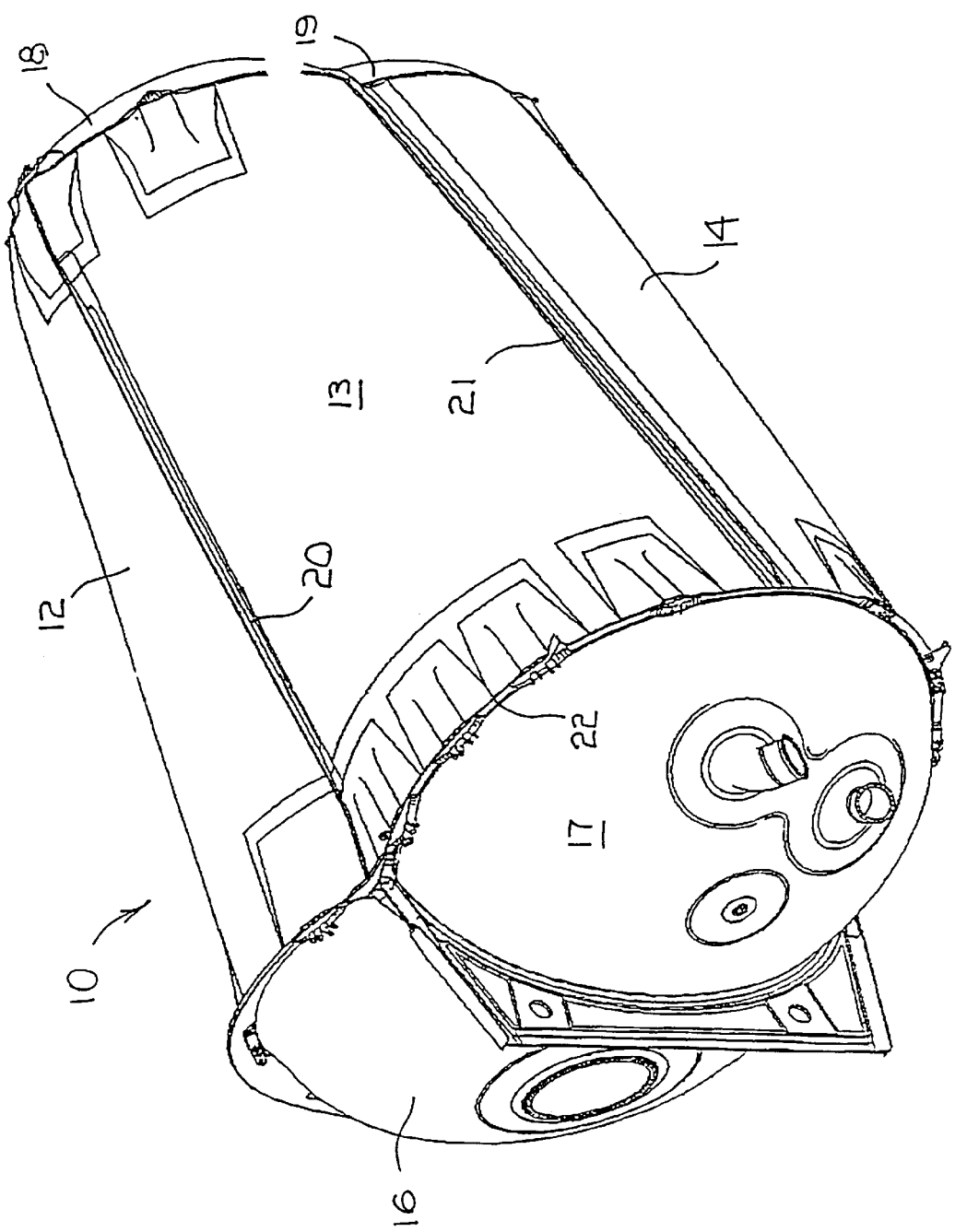
FIG. 1 is an isometric view of a multi-lobe cryogenic liquid propellant tank comprising joints in accordance with an embodiment of the present invention.

FIG. 1 illustrates a multi-lobed cryogenic liquid propellant tank 10 in accordance with an embodiment of the present invention. The multi-lobed tank 10 may be used with the X-33 single stage to orbit vehicle described in U.S. application Ser. No. 09/009,355. The multi-lobed tank 10 includes multiple barrel sections, with three of the tank barrels 12, 13 and 14 shown in FIG. 1. Multiple domes 16, 17, 18 and 19 are joined to the tank barrels 12, 13 and 14.

As shown in FIG. 1, cryogenic liquid propellant tank joints 20, 21 and 22 of the present invention are used to joint the tank barrels 12, 13 and 14 together, and are further used to join the domes 16, 17, 18 and 19 to the tank barrels 12, 13 and 14.

Figure 2:
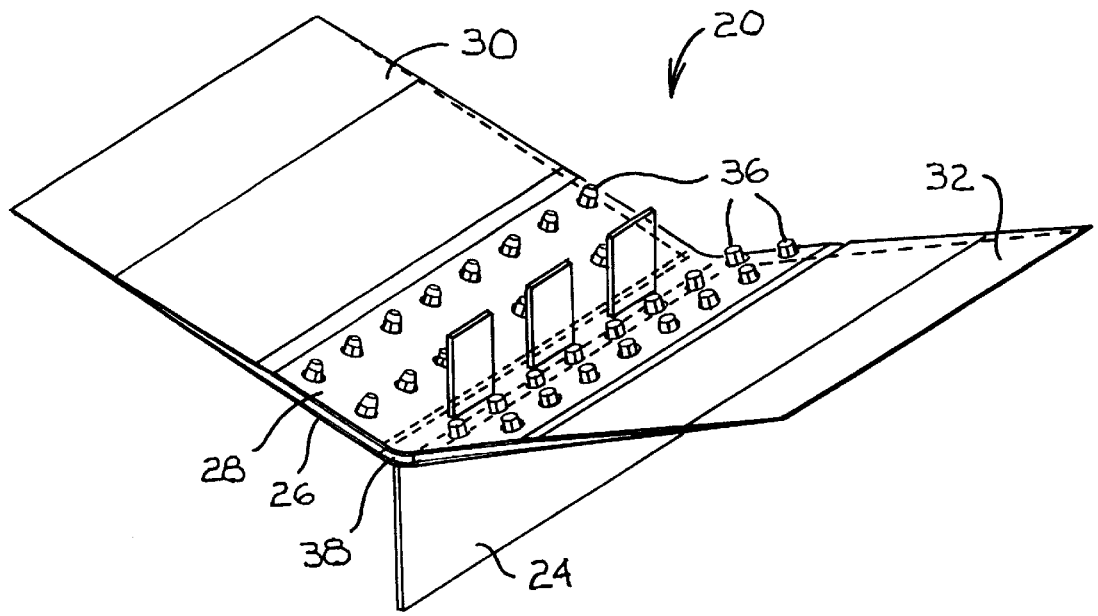
FIG. 2 is an isometric view of a cryogenic tank joint section in accordance with an embodiment of the present invention.
Figure 3:
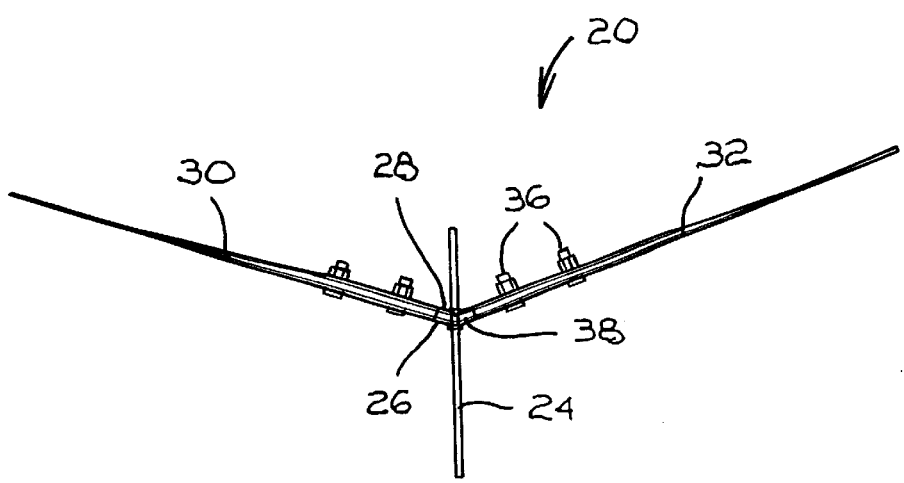
FIG. 3 is a side view of the cryogenic tank joint of FIG. 2.
Figure 4:
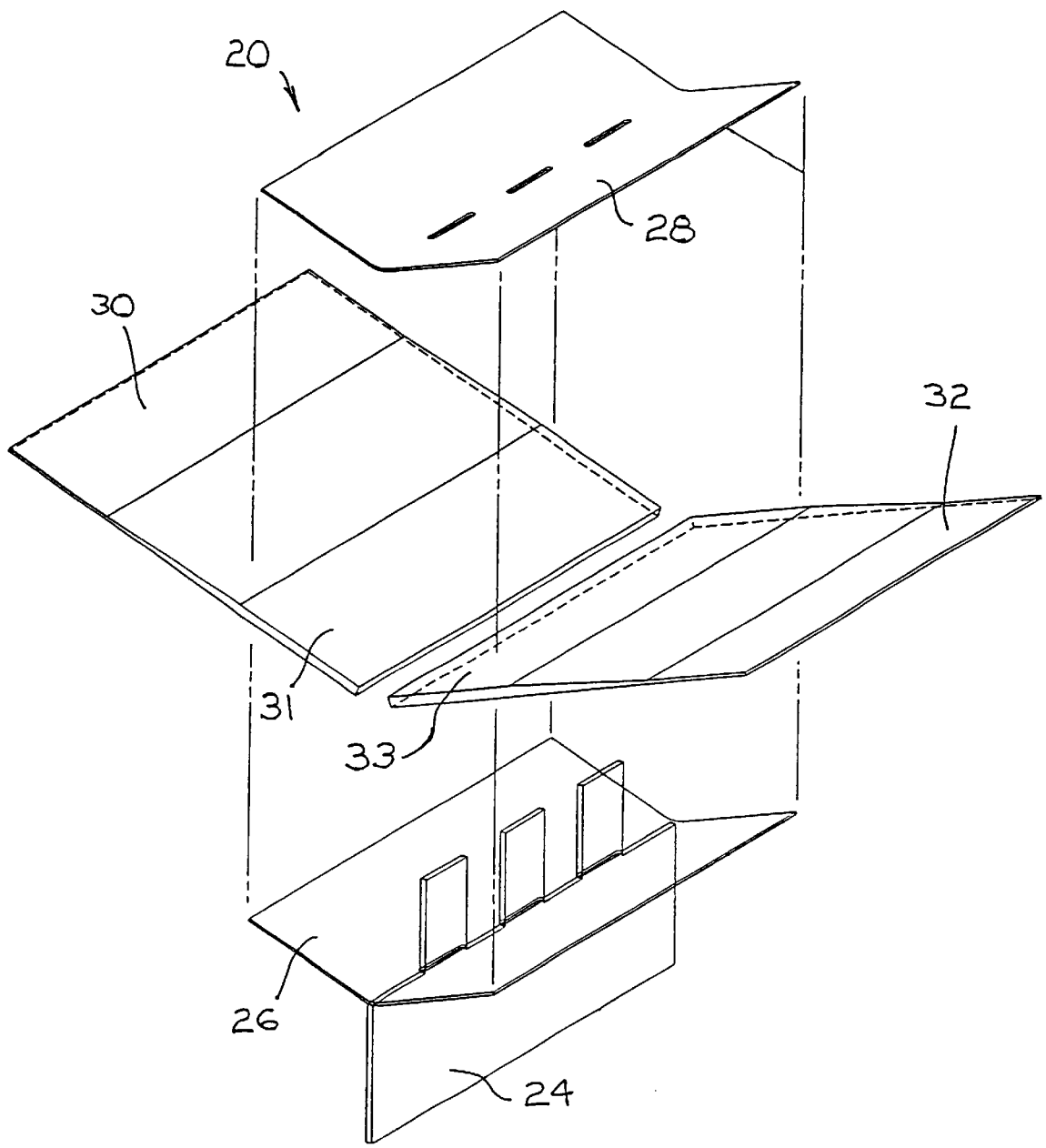
FIG. 4 is an exploded view of the components of the cryogenic tank joint of FIG. 2.

FIGS. 2–4 illustrate a section of a tank joint 20 in accordance with a preferred embodiment of the present invention. The tank joint 20 comprises a support plate 24 onto which a lower arm 26 and an upper arm 28 are mounted. In the embodiment shown in FIGS. 2–4, the lower and upper arms 26 and 28 are each substantially V-shaped. Tank skins 30 and 32 extend into the spaces between the lower and upper arms 26 and 28. The tank skins 30 and 32 may comprise barrel and/or dome sections of the tank assembly. As shown most clearly in FIG. 4, the tank skins 30 and 32 include reinforced sections 31 and 33, respectively, which have greater thicknesses than the main portions of the tank skins 30 and 32. As shown most clearly in FIGS. 2 and 3, mechanical fasteners such as bolts or the like are used to fasten the tank skins 30 and 32 between the lower and upper arms 26 and 28. The support plate 24 and lower and upper arms 26 and 28 are preferably made from titanium. The tank skins 30 and 32 are preferably made from a composite laminate such as graphite/epoxy.

As shown in FIGS. 2 and 3, a purge cavity 38 is formed between the lower and upper arms 26 and 28, and between the edges of the tank skins 30 and 32. The purge cavity 38 may be used to monitor the integrity of the joint seal, as more fully described below. The purge cavity 38 preferably extends substantially along the entire length of the tank joint.

Figure 5:
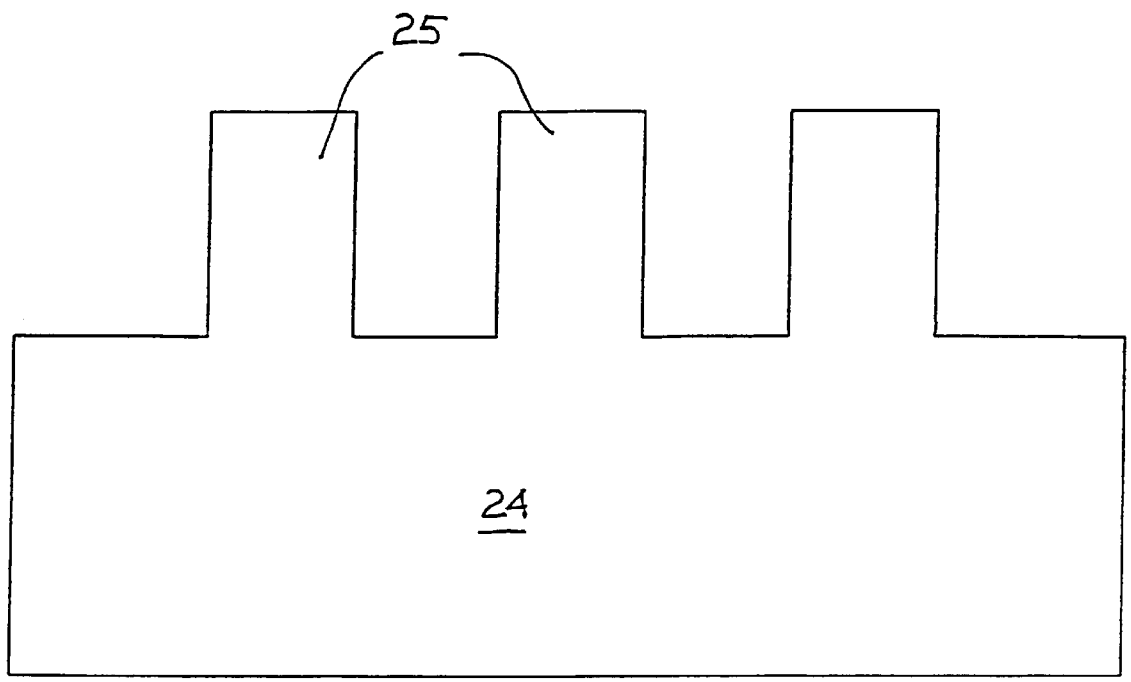
FIG. 5 is a front view of a toothed plate of a cryogenic tank joint in accordance with an embodiment of the present invention.
Figure 6:
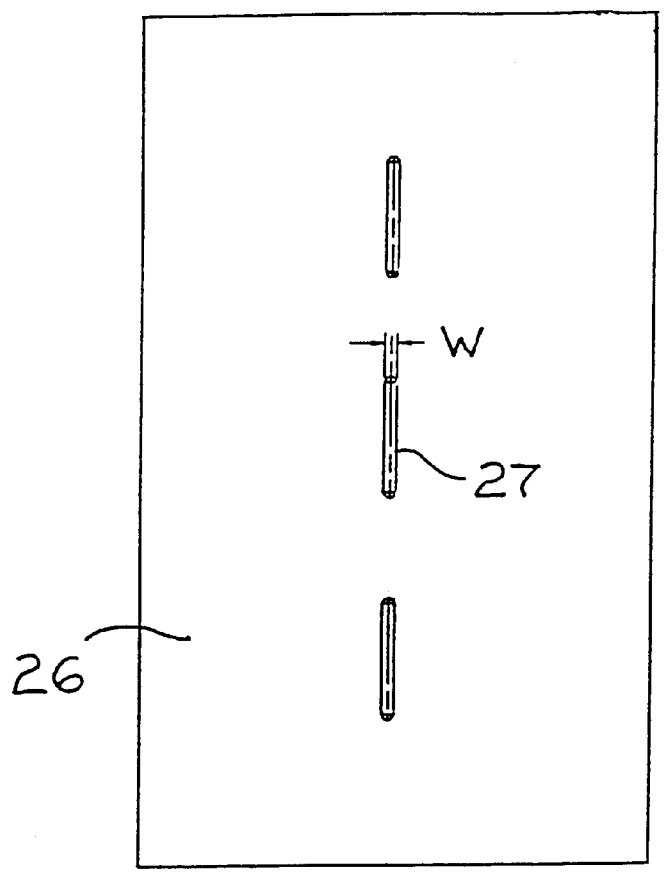
FIG. 6 is a top view of a V-shaped arm of a cryogenic tank joint in accordance with an embodiment of the present invention.

FIG. 5 illustrates a section of the preferred support plate 24 of the present invention. The support plate 24 includes teeth 25 which extend through slots 27 in the lower arm 26, as shown in FIG. 6. Although not shown in FIG. 6, the teeth 25 also extend through similar slots in the upper arm 28. The width W of the slots 27 is substantially equal to the thickness of the teeth 25 of the support plate 24. The teeth 25 of the support plate 24 may either extend inwardly or outwardly from the tank. For example, when the teeth 25 extend from the external surface of the tank, such extensions may be used to attach various types of components (not shown) to the tank.

Figure 7:
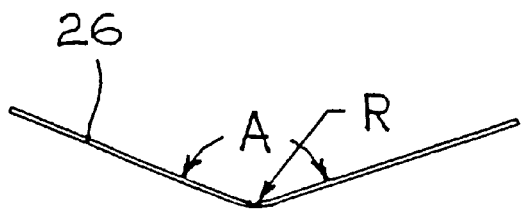
FIG. 7 is an end view of the V-shaped arm of FIG. 6.

As shown in FIG. 7, the substantially V-shaped lower arm 26 comprises a joint angle A and a bend radius R. The joint angle A may vary widely depending upon the desired joint configuration. For many joints, the joint angle A ranges from about 20 to 340E, typically from about 160 to 240E. The joint angle A may remain substantially constant along the length of the tank joint. Alternatively, the joint angle A may vary along the length of the tank joint. As a particular example, in the multi-lobed X-33 tank shown in FIG. 1, the joint angle A for the joints 20 and 21 between the tank barrels 12, 13 and 14 vary from about 0 to 100 E along the length of each joint. The joint angle A for the joint 22 between the tank barrel 13 and the dome 17 varies from about 0 to 40E along the length of the joint. The bend radius R of the lower arm 26 shown in FIG. 7 typically ranges from about 0.5 to about 2 cm.

Figure 8:
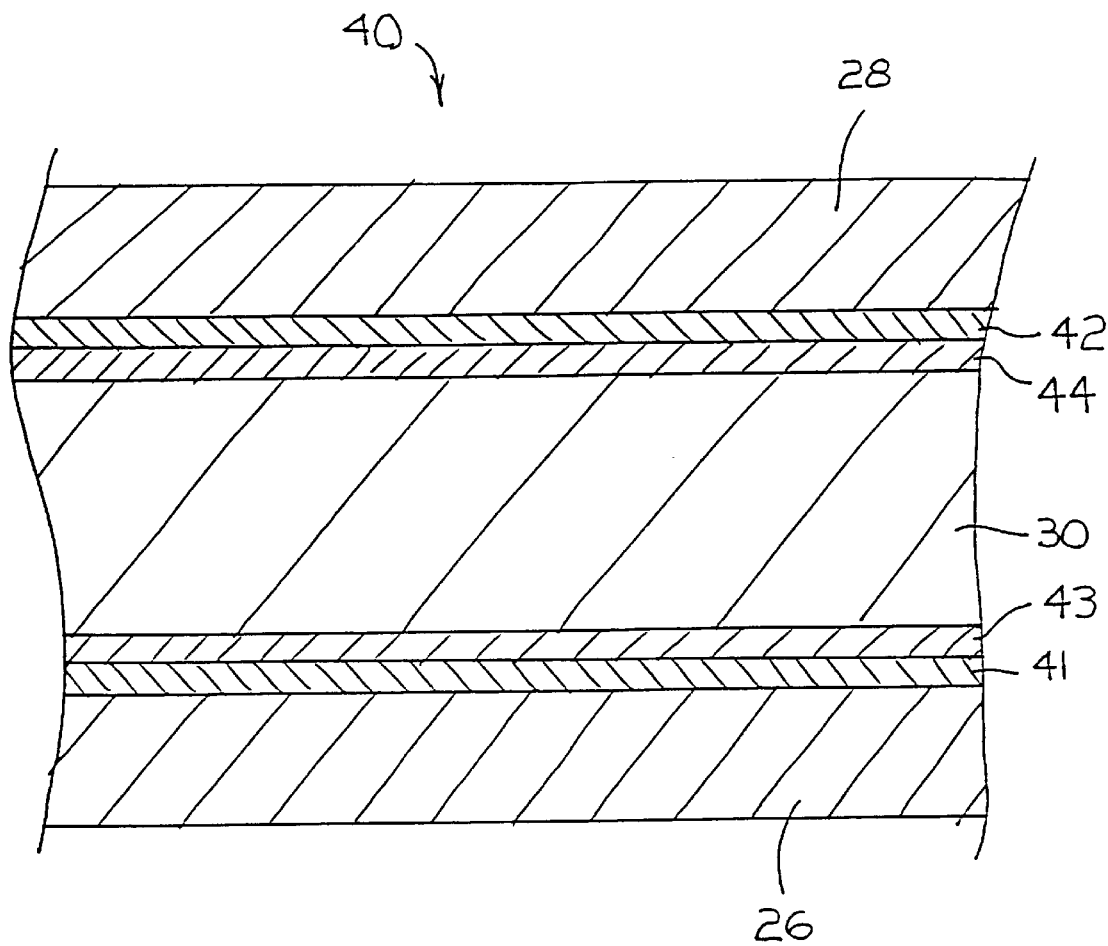
FIG. 8 is a schematic sectional view of a tank joint seal in accordance with an embodiment of the present invention.

FIG. 8 schematically illustrates a cross-section of a tank joint seal 40 in accordance with a preferred embodiment of the present invention. The lower arm 26 has a layer of solder 41 attached thereto, while the upper arm 28 has a layer of solder 42 attached thereto. The solder layers 41 and 42 may be made of any suitable material such as a tin-indium alloy. Each of the solder layers 41 and 42 has a preferred thickness of from about 0.01 to about 0.13 mm. In the embodiment shown in FIG. 8, the joint seal 40 further includes metal layers 43 and 44 attached to the tank skin 30. The metal layers 43 and 44 may be made of any suitable metal such as copper foil having a preferred thickness of from about 0.25 to about 0.50 mm. As more fully described below, during assembly of the tank joint, adjacent layers of the joint seal 40 are welded together to provide a substantially leak-tight seal.

In a preferred embodiment, a copper foil is co-cured with the composite laminate tank skin to achieve a uniform bond. Tin-indium solder is wetted to the copper surface and the lower and upper arms provide the sealing mechanism during assembly. The joint may be manufactured from titanium sheet stock, for example, in sections of six to eight feet long, then welded end-to-end to make the desired length. The support plate 24 is first welded to the lower arm 26, then the upper arm 28 is welded in a similar fashion, offset from the first arm 26 by the thickness of the composite laminates 30 and 32. After completion of a six or eight foot section, a titanium oxide layer or other protective coating may be formed on exposed surfaces of the part using a conventional deposition process. The titanium oxide layer, or any other suitable protective material, provides protection from the contents of the tank during operation, e.g., protects the underlying titanium components from hydrogen attack. After deposition of the protective layer, the sections are welded together to complete the joint. The joining members may then be brought together to form the skeletal structure of the tank.

The preferred composite laminate of the tank skins 30 and 32 may be manufactured using known processing techniques. A metal layer such as a copper foil layer is preferably co-cured at the edge of the laminate to be used later as part of the seal. After cure of the laminate, the copper surface may be exposed by lightly sanding away any residual resin from the composite. This fresh surface can also readily accept a coating of the tin-indium solder or the like. The skin is then fitted to the skeletal structure and the fastener hole patterns are drilled. After drilling, the parts are taken apart and cleaned. When the tank skin is ready for final mating to the skeletal structure, the copper foil area is cleaned and wetted with a thin layer of solder, e.g., tin-indium solder. Similarly, the mating part of the titanium joint is wetted with tin-indium solder or the like. The skin is then bolted to the skeletal structure. The resulting pressure between the titanium arms and the composite laminate cold-welds the tin-indium surfaces together to form a seal. In the event that the surfaces do not cold-weld, for example, due to lack of cleanliness, the area can be heated to reflow the solder and provide a positive seal. Sealing around the bolt holes may optionally be accomplished using indium-plated washers which mate and bond to the titanium arms.

In accordance with the preferred embodiment of the present invention, the joint is made from three sheet pieces that may be cut, e.g., water-jet cut, then formed and welded together. This translates into lower material and manufacturing costs. For example, six to eight foot sections of the joint may be fabricated at a time, then welded together to make a complete length of joint. The nature of the two titanium arms which envelope the composite laminate aids in manufacturing and assembly by making the barrel skin a simple lay-up with a build-up at the edges for bolt bearing. The skin is preferably attached to the joint using two rows of bolts. A soft indium or tin-indium alloy foil gasket along with the copper layers provide the seal. Any leakage past the gasket collects in the cavity formed at the center of the joint. This cavity can be evacuated actively during operations. The health of the joint and seal can be monitored by measuring the contents of the gas in this cavity. If gaseous hydrogen is detected, then damage or leakage assessment can be made. Depot level maintenance checks can be made on the joint by examining each bolt hole at suggested intervals. Bolt retorque, if needed, may be performed.

Advantageous features of the invention include the method of assembly using slotted arms mounted on a toothed member, and the use of sections to assemble a complete joint member. Furthermore, the use of two arms that envelope and seal the composite skin provide a purge cavity at the center of the joint that can be used for joint health monitoring. To protect the titanium from the hydrogen environment, a layer of titanium oxide may be built up on the exposed surface of the titanium. This oxide layer can readily receive a coating of tin-indium solder, a low-melting point alloy that remains malleable at cryogenic temperatures. The composite skin that fits between the titanium arms preferably has a layer of thin copper co-cured into the laminate at the surface. The two surfaces are then mated, using the tin-indium solder which cold-welds easily. Even if the surfaces do not immediately weld together, local heat can be applied to reflow the tin-indium solder. The main leak path of the joint is thereby sealed.

Whereas particular embodiments of this invention have been described above for purposes of illustration, it will be evident to those skilled in the art that numerous variations of the details of the present invention may be made without departing from the invention as defined in the appended claims.

What is claimed is:

1. A cryogenic liquid propellant tank comprising:
   at least one tank skin; and
   at least one tank joint comprising:
   (a) a support plate;
   (b) a lower arm mounted on the support plate;
   (c) an upper arm mounted on the support plate spaced from the lower arm, wherein a portion of the at least one tank skin is sealed between the lower and upper arms; and
   wherein said support plate having teeth which extend through slots in said lower and upper arms.

2. The tank of claim 1, wherein each of the lower and upper arms is substantially V-shaped.

3. The tank of claim 2, wherein each of the upper and lower arms defines a joint angle of from about 20 to about 340E.

4. The tank of claim 3, wherein the joint angle is from about 160 to about 240E.

5. The tank of claim 3, wherein the joint angle is substantially constant along the length of the tank joint.

6. The tank of claim 3, wherein the joint angle varies along the length of the tank joint.

7. The tank of claim 1, further comprising a plurality of mechanical fasteners securing the upper and lower arms and the at least one tank skin together.

8. The tank of claim 1, wherein the support plate, lower arm and upper arm comprise titanium.

9. The tank of claim 8, wherein at least a portion of the titanium is coated with a protective oxide layer.

10. The tank 22 of claim 1, wherein the tank skin comprises a composite laminate.

11. The tank of claim 10, wherein the composite laminate comprises graphite fibers within an epoxy matrix.

12. The tank of claim 1, further comprising at least one seal layer between the at least one tank skin and the upper and lower arms.

13. The tank of claim 12, wherein the at least one seal layer comprises a metal layer.

14. The tank of claim 13, wherein the metal layer comprises tin-indium solder.

15. The tank of claim 13, wherein the metal layer comprises copper foil.

16. The tank of claim 12, wherein the at least one seal layer comprises tin-indium layers on opposing surfaces of the lower and upper arms, and copper foil layers adhered to the at least one tank skin in contact with the tin-indium layers.

17. The tank of claim 1, further comprising a purge chamber defined by opposing surfaces of the lower and upper arms, and by opposing edges of the at least one tank skin.

18. The tank of claim 17, wherein the purge chamber extends substantially along the entire length of the tank joint.

* * * * *